United States Patent

Wang

[11] Patent Number: 6,036,902
[45] Date of Patent: Mar. 14, 2000

[54] METHOD FOR MANUFACTURING A SLIP-RESISTANCE MAT

[76] Inventor: Pai-Yen Wang, No. 26, Ting Shih Tso Road, Hsin-Tien City, Taipei Hsien, Taiwan

[21] Appl. No.: 09/003,831

[22] Filed: Jan. 8, 1998

[51] Int. Cl.[7] .................................................. B27N 3/10
[52] U.S. Cl. ......................... 264/132; 264/162; 264/243; 264/257; 264/265; 264/266
[58] Field of Search .................................. 264/132, 243, 264/266, 257, 138, 162, 265

[56] References Cited

U.S. PATENT DOCUMENTS

| | | | |
|---|---|---|---|
| 3,246,066 | 4/1966 | Gits | 264/132 |
| 4,835,030 | 5/1989 | Squier et al. | 264/257 |
| 5,375,271 | 12/1994 | Frankel | 4/581 |

FOREIGN PATENT DOCUMENTS

| | | | |
|---|---|---|---|
| 0154144 | 12/1980 | Japan | 264/257 |
| 2108838 | 11/1981 | United Kingdom . | |

Primary Examiner—Jan H. Silbaugh
Assistant Examiner—Dae Young Lee
Attorney, Agent, or Firm—Bacon & Thomas

[57] ABSTRACT

A method for manufacturing a slip-resistance mat includes the following steps: (1). providing a sheet of textile having patterns on one side thereof and then treating the other side of the sheet of textile so as to be provided with woolen yarns; (2). providing a rubber plate; (3). placing the sheet of textile and the rubber plate into a mold in a manner that the side of the sheet of textile having woolen yarns is corresponding to the rubber plate, the surface of the mold in contact with the sheet of textile being formed with pattern-shaped hollows and the surface of the mold in contact with the rubber plate being formed with sucking-disk-shaped hollows; (4). pressing the mold under high temperature so that the rubber plate is melted and the melted rubber is infiltrated into the woolen yarns and the fibers of the sheet of textile so that the sheet of textile is coupled securely to the rubber plate to form a slip-resistance mat. According to this, the surface of the sheet of textile is formed with patterns by means of pattern-shaped hollows of the mold so as to show 3-D image.

5 Claims, 4 Drawing Sheets

METHOD FOR MANUFACTURING A SLIP-RESISTANCE MAT

FIELD OF THE INVENTION

The present invention relates to a slip-resistance mat and in particular to a method for manufacturing a slip-resistance mat.

BACKGROUND OF THE INVENTION

Conventionally, rubber plates made of rubber materials are used as a slip-resistance mat and placed on humid places, such as kitchens, bathrooms etc. for preventing from slipping, because rubber materials have a greater friction coefficient.

However, such rubber plates are formed integratedly with a monotonous form and there are no patterns on the surface thereof so that the senses of sight of such rubber plates are dull. Further, such rubber plates can't absorb effectively water.

Therefore, textile having patterns on the surface thereof are coated on and adhered to the surface of these rubber plates by means of an adhesive for manufacturing a slip-resistance mat to increase the sense of sight of the slip-resistance mat and absorb water.

However, the adhesive between the rubber plates and the textile may be degraded after prolonged use so that the rubber plates are disconnected with the textile. Also, the patterns of the textile are printed on the surface of the textile by means of a plane printing technique without 3-D image.

Therefore, a slip-resistance mat made of forming materials is developed for providing 3-D image. The slip-resistance mat is formed with an uneven surface which can incorporate with different colour codes to increase it's aesthetic value.

However, the slip-resistant effect of the slip-resistance mat made of forming materials is poor.

Thus, it is desirable to have a method for manufacturing a slip-resistance mat to produce a slip-resistance mat which can solve the above problems.

SUMMARY OF THE INVENTION

The principal object of the present invention is to provide a method for manufacturing a slip-resistance mat, by which a sheet of textile can be coupled securely to a rubber plate as so to produce a slip-resistance mat which has an excellent sense of sight and slip-resistant effect.

In accordance with the present invention, there is provided a method for manufacturing a slip-resistance mat comprising following steps: (1). providing a sheet of textile having patterns on side thereof and then treating the other side of the sheet of textile so as to be provided with woolen yarns; (2). providing a rubber plate; (3). placing respectively the sheet of textile and the rubber plate on an upper mold formed with uneven surface in contact with the sheet of textile and a lower mold of a mold; and (4). pressing the mold under high temperature so that the rubber plate is melted and then the melted rubber is infiltrated into the woolen yarns and fibers of the sheet of textile. According to this, the sheet of textile is coupled securely to the rubber plate and shows 3-D image.

BRIEF DESCRIPTION OF THE DRAWINGS

The present invention will be better understood from the following description of preferred embodiment thereof, with reference to the attached drawings, wherein.

DETAILED DESCRIPTION OF THE PREFERRED EMBODIMENTS

Figure 1:
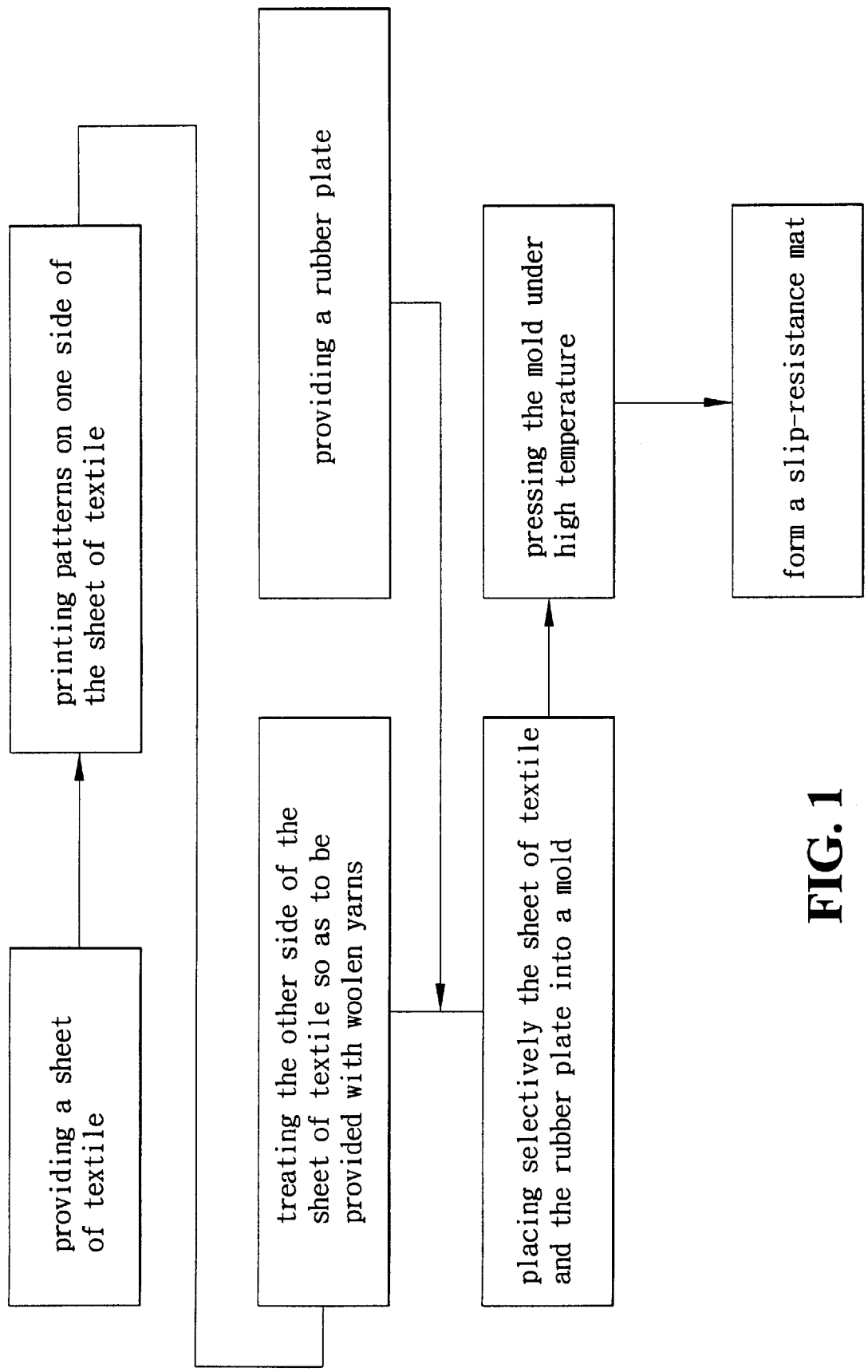
FIG. 1 is a procedure showing a method for manufacturing a slip-resistance mat in accordance with the present invention.

With reference to the drawings and in particular to FIG. 1, a method for manufacturing a slip-resistance mat in accordance with the present invention is shown. As shown in FIG. 1, the elements used in the method for manufacturing a slip-resistance mat in accordance with the present invention comprises a rubber plate 3 and a sheet of textile 4, wherein the manufacturing procedure of the rubber plate 3 comprises following steps: (1). adding an accelerator, an operating oil, an antideteriorant and a filler into a rubber and then stirring the mixture thereof so as to mix them homogeneously; and (2). adding a chlorinated paraffin wax resin and a sulfur into the mixture of step (1) to form a rubber plate. The purpose of adding the accelerator is to prevent raw materials from resolving and degrading, the purpose of adding the filler is to reduce the cost of manufacture, the purpose of adding the chlorinated paraffin wax resin is to increase viscosity and prevent from degrading, and the purpose of adding the sulfur is to urge above raw materials to form a rubber plate. The rubber plate is substantially a raw material.

Further, the manufacturing procedure of the sheet of textile 4 comprises following steps: (1). printing desired patterns or designs on one side of a sheet of textile by using dyes as pigments and then adding chlorinated paraffin wax resin on the patterns or designs so as to harden the dyes; and (2). treating the other side of the sheet of textile so as to be provided with woolen yarns.

Figure 2:
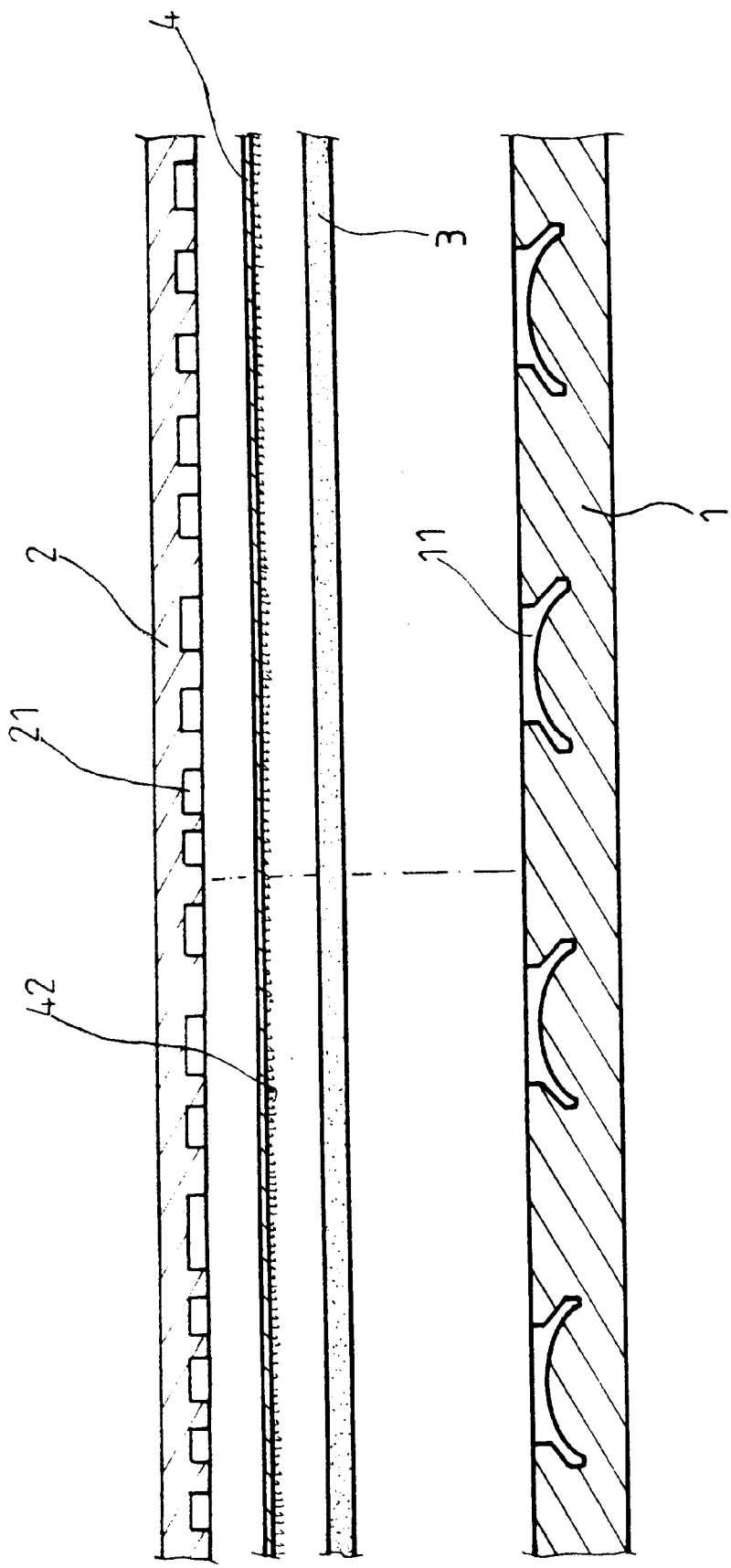
FIG. 2 is a partial cross-sectional view showing a state that a rubber plate and a sheet of textile are put in a mold in accordance with the present invention.

The present invention further discloses a mold having an upper mold 2 and a lower mold 1, wherein the lower mold 1 is formed with sucking-disk-shaped hollows 11 on the surface thereof the upper mold 2 and the upper mold 2 is formed with pattern-shaped hollows 21 on the surface thereof the lower mold 1, as shown in FIG. 2. The patterns-shaped hollows 21 can be designed to form different shapes according to requirements.

Figure 3:
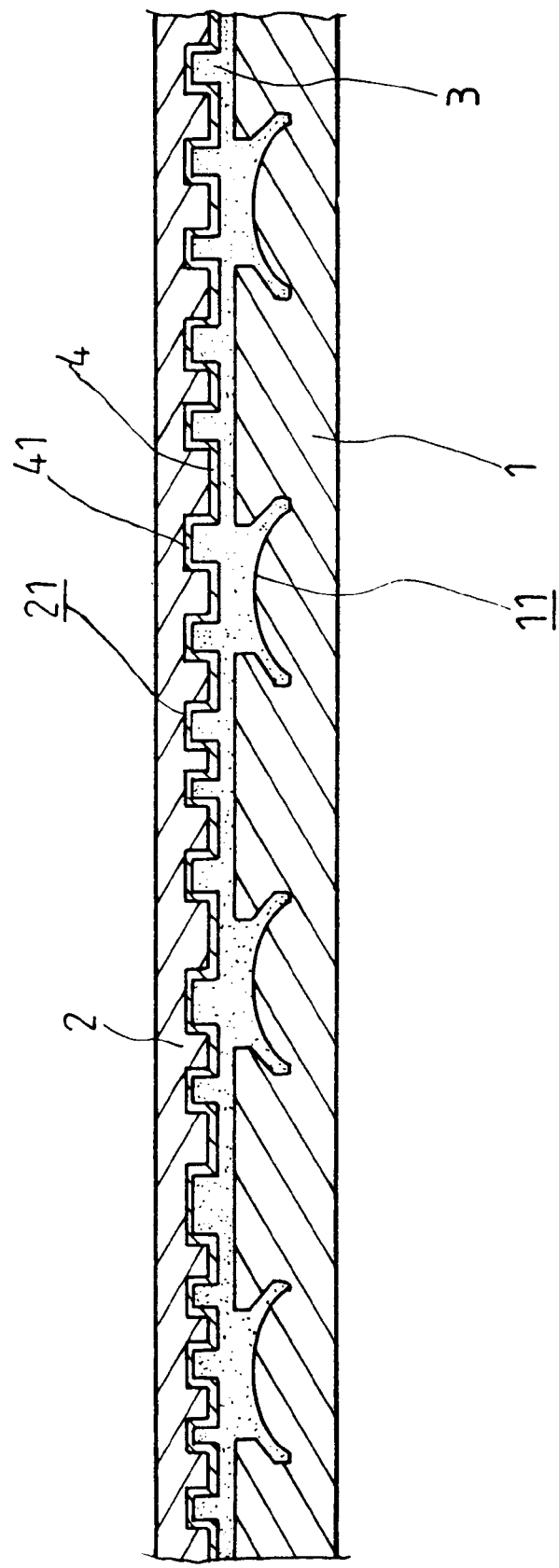
FIG. 3 is a partial cross-sectional view showing a state where the mold of FIG. 2 is hot-pressing the rubber plate and the sheet of textile.
Figure 4:
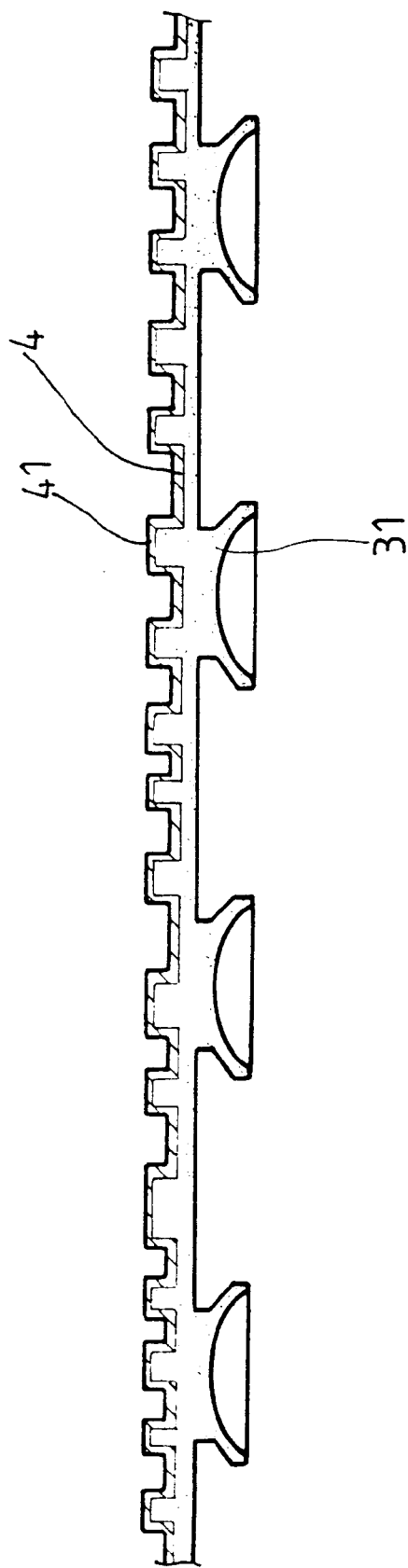
FIG. 4 is a partial cross-sectional view showing a slip-resistance mat in accordance with the present invention.

Further, the method for manufacturing a slip-resistance mat in accordance with the present invention, as shown in FIG. 1, comprises following steps: (1). placing the rubber plate 3 in the lower mold 1 and then placing the sheet of textile 4 onto the rubber plate 3 in a manner that the side of the sheet of textile 4 having woolen yarns is corresponding to the rubber plate 3 (as shown in FIG. 2); (2). covering the upper mold 2 on the lower mold 1 and then pressing the mold(as shown in FIG. 3) under high temperature, preferably at the range between 150° C. to 160° C., so that the rubber plate 3 is melted and the melted rubber is infiltrated into woolen yarns 42 and fibers of the sheet of textile 4 so that the rubber plate 3 can be coupled securely to the sheet of textile 4 after the melted rubber is cooled off, the melted rubber is also infiltrated into the sucking-disk-shaped hollows 11 of the lower mold 1 so that the rubber plate 3 is formed with sucking disks, at the same time, according to the pressure provided, the surface of the sheet of textile 4 is formed with patterns 41 by means of the pattern-shaped hollows 21 of the upper mold 2; and (3). separating the upper mold 2 from the lower mold 1 as so to form a slip-resistance mat shown in FIG. 4. According to this, the sheet of textile 4 can be coupled securely to the rubber plate 3 and the sheet of textile 4 can show 3-D image so as to increase the sense of sight of the slip-resistance mat.

The present invention has been particularly shown and described with reference to the preferred embodiment thereof, it will be understood to those skilled in the art the various changes in form and details may be made therein without departing from the spirit and scope of the invention.

What is claimed is:

1. A method for manufacturing a slip-resistant mat which comprises
   (1) treating one side of a sheet of textile material to provide it with woolen yarns on said one side;
   (2) providing a rubber plate;
   (3) placing the sheet of textile material and the rubber plate into a mold having two surfaces in a manner that the side of the sheet of textile material having woolen yarns faces the rubber plate, and a surface of the mold in contact with the sheet of textile material contains pattern-shaped hollows; and
   (4) pressing the mold under high temperature so that the rubber plate is melted, the melted rubber plate infiltrates into the woolen yarns and fibers of the sheet of textile material so that the rubber plate is securely coupled to the sheet of textile material so as to form a slip resistant mat, while a surface of the sheet of textile material is formed with a pattern by means of the pattern-shaped hollows of the mold so as to obtain a 3-D image.

2. The method for manufacturing a slip-resistant mat as claimed in claim 1, wherein the surface of the mold in contact with the rubber plate is formed with sucking-disk-shaped hollows so that the rubber plate is formed with sucking disks during pressing the mold under high temperature.

3. The method for manufacturing a slip-resistant mat as claimed in claim 2, wherein the temperature during the pressing of the mold is in the range of between 150° C. to 160° C.

4. The method for manufacturing a slip-resistant mat as claimed in claim 1, wherein the temperature during the pressing of the mold is in the range of between 150° C. to 160° C.

5. The method for manufacturing a slip-resistant mat as claimed in claim 1, wherein patterns are printed on the surface of the sheet of textile before the sheet of textile is placed in the mold.

* * * * *